TRANSISTORIZED MULTIVIBRATOR WITH BUILT-IN TIME DELAY

Filed March 26, 1963

INVENTOR.
BERT W. LAREY

BY Howard J. Murray Jr. AGENT
George J. Rubens ATTORNEY

United States Patent Office 3,185,865
Patented May 25, 1965

3,185,865

TRANSISTORIZED MULTIVIBRATOR WITH BUILT-IN TIME DELAY

Bert W. Larey, Ventura, Calif., assignor to the United States of America as represented by the Secretary of the Navy Filed Mar. 26, 1963, Ser. No. 268,162
4 Claims. (Cl. 307—88.5)
(Granted under Title 35, U.S. Code (1952), sec. 266)

Figure 1:
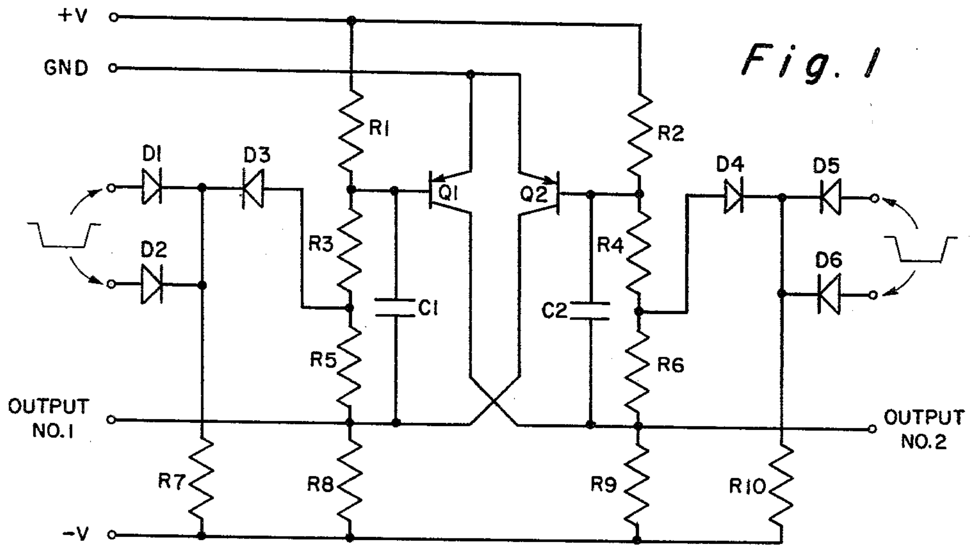

The invention described herein may be manufactured and used by or for the Government of the United States of America for governmental purposes without the payment of any royalties thereon or therefor.

The present invention relates to multivibrators, or flip-flop circuits, having two steady states and two input terminals each of which corresponds with one of the two states, the circuit remaining in either state until caused to change to the other state by application of the corresponding input signal.

Multivibrators of the type to which the present disclosure relates are extensively employed in computers and data-processing systems as operators in a system of symbolic logic. When so used, it is desirable that the multivibrator be transistorized for low power consumption and reliability. With the two steady states of the multivibrator being designated as the set and not-set conditions, it is preferable (in the case of PNP transistors) that the low, or most negative, signal level be defined as the set condition. There are three main reasons for this choice—(1) the set, or falling, signal turns on the transistor, which is easier and faster than turning it off, (2) all of the signal or gate loads are then supplied by the transistor rather than by its collector output impedance, yielding more clearly defined and stable signal levels, and (3) the total current is proportional to the relative circuit loading at any given time rather than to a constant high output impedance.

Certain conditions must be met when networks of the type under discussion are utilized for logical operations, serial shift registers, and so on. Most importantly, the normally set output of the flip-flop should rise to a not-set condition *before* the not-set side falls to a set condition. When the set side turns off near the end of the clock, or triggering, pulse, the conditions for logical delay are present. If the flip-flop were not set, and its set output were connected to an AND gate the other leg of which is connected to the same clock pulse which drives the flip-flop, then the first clock pulse would set the flip-flop without generating an output from the gate and also reset the flip-flop. It will thus be recognized that a certain amount of time delay is required in order for a circuit of this nature to properly function in the environment set forth. Heretofore, many circuit arrangements have been made more complex by the addition of one or more R-C networks to achieve the necessary delay, together with the incorporation therein of separate noise-reducing components, all of which add to the cost of the resulting equipment and increase the possibility of electrical and/or mechanical failure.

In complex data-processing apparatus it is necessary to couple together many logical elements of the type above described. For transistorized multivibrators, the most common expedient is to couple the driving signal into either the base or collector electrode of the driven transistor. In the case of base coupling, a number of disadvantages result. Primarily, the addition of separate delayed output stages is necessary, and, furthermore, little noise suppression is possible without resorting to extra rectifying elements and/or transistors beyond the two making up the multivibrator. Then, too, power requirements are higher when such additional components are employed. In the case of collector coupling, not only are the above-mentioned disadvantages present, but, furthermore, the driving signal must also drive the collector loads.

It is a feature of the present invention that flip-flop circuits of the type under discussion may be directly coupled by feeding the input signal not to either the base or collector of the driven transistor, but rather to a resistor junction therebetween. It has been determined in practice that such an expedient permits logical coupling without the use of additional delay components, and, furthermore, results in a material amount of noise suppression. Other advantages obtainable from the use of applicant's concept are that the input load resistors of the multivibrator have the driving signal appearing directly thereacross, resulting in a known and predictable input impedance; slight variations in the power supply will not adversely affect circuit stability; and, finally, circuit operation takes place over a much wider variation of input pulse widths than with conventionally triggered circuits.

One object of the present invention, therefore, is to provide an improved type of direct-coupled bistable multivibrator or flip-flop.

A further object of the invention is to provide a bistable multivibrator especially for use as a logical element in data-processing equipment.

An additional object of the invention is to provide a bistable multivibrator incorporating a "built-in" time delay in the sense that the multivibrator reaches one of its steady-state conditions prior to the instant at which its remaining steady-state condition is terminated.

Figure 2:
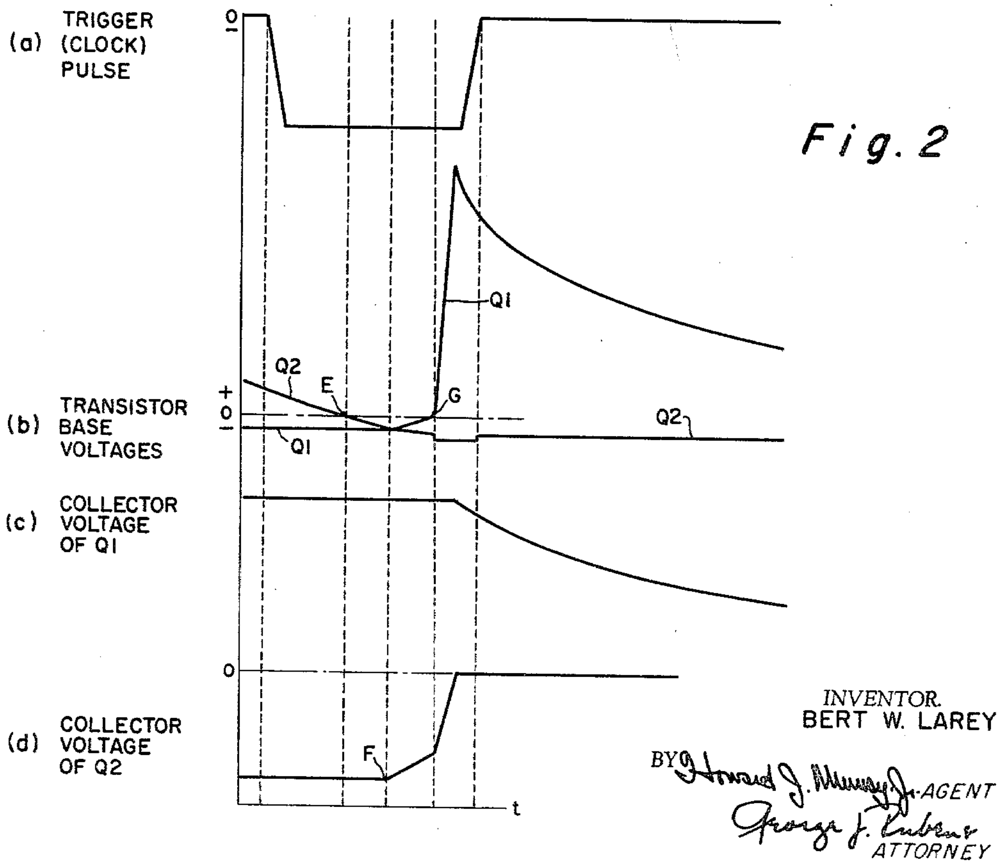

Other objects and many of the attendant advantages of this invention will be readily appreciated as the same becomes better understood by reference to the following detailed description when considered in connection with the accompanying drawings wherein:

FIG. 1 is a schematic circuit diagram of a preferred form of bistable multivibrator designed in accordance with a preferred embodiment of the present invention; and FIG. 2 is a set of waveforms useful in explaining the operation of the circuit of FIG. 1.

Referring now to FIG. 1 of the drawings, there is shown a transistorized multivibrator, or flip-flop, which includes two transistors Q1 and Q2. These components are illustrated as being of the PNP type, the respective emitter electrodes of which are connected directly to ground. It should be understood, however, that the illustration of PNP transistors is for use in direct-coupled negative logic. For NPN transistors and positive logic, the power supply polarities and the circuit diodes (to be subsequently described) would be reversed.

The basic circuit connections of the various elements of FIG. 1 are generally similar to those of a conventional flip-flop circuit. That is, resistors R1 and R2 are standard "turn-off" resistors, and resistors R8 and R9 are the usual collector load resistors. Resistors R3 and R5 as a unit, together with resistors R4 and R6 as a unit, constitute the collector-to-base resistors of the multivibrator. The input signal (illustrated in FIG. 2*a* as a substantially rectangular negative-going trigger or clock pulse), is applied to the circuit either through the diodes D1, D2 or the diodes D5, D6. In the first instance, this voltage appears across the input load resistor R7, and, in the latter case, it appears across the input load resistor R10. Although not essential to the present concept, it may be mentioned that when the invention circuit is employed for logical operation, the diodes D1, D2 and the resistor R7 comprise a standard AND gate, as do the diodes D5, D6 and resistor R10. The input signal, having passed through such gates, is applied to the flip-flop through further diodes D3 and D4. In actual practice, the diodes D3 and D4 are normally paralleled by additional diodes to comprise an OR gate, but such components form no part of the present invention and have been omitted from the drawings for the sake of simplicity. It will be understood by workers in the art, however, that the AND gates may have any number of legs, and that additional OR diodes (not shown) may be connected to the AND gates or left floating. It is only necessary for an understanding of the present invention, however, that two input signals, such as shown in FIG. 2*a*, be applied respectively to a point between resistors R3 and R5 and to a point between resistors R4 and R6. The four resistors R1, R3, R5 and R8 are connected in series between a terminal +V of positive unidirectional potential and a terminal —V of negative unidirectional potential. In similar fashion, the four resistors R2, R4, R6 and R9 are connected in series between these same two terminals and in parallel with the series combination of R1, R3, R5 and R8.

In describing the operation of the circuit of FIG. 1, let it first be assumed that transistor Q1 is fully conducting, or, in other words, that it is fully saturated. Since each transistor is only conductive when the voltage on the base electrode thereof is negative, the transistor Q2 is held in a non-conductive condition.

Assume further that a negative-going trigger pulse (such as shown in FIG. 2*a*) is applied to the junction point between resistors R4 and R6 through diode D4 and one or both of the diodes D5 and D6. Since R10 is the input load resistor, a decrease in voltage thereacross will cause the potential between R4 and R6 to go negative. The junction point between R2 and R4 (which is normally slightly positive to maintain Q2 non-conductive) is also made negative by the presence of the input pulse. Q2 now starts to conduct to raise the voltage across R8, and this same rise in voltage across R8 is coupled through C1 to the base electrode of Q1 thus turning it off. As Q1 turns off, the current through output load resistor R9 decreases and the voltage across it drops. As a result, the current through R4 and R6 increases, which tends to maintain Q2 in a conductive state.

To reverse the above action, the application of a negative trigger pulse to the junction between resistors R3 and R5 will cause this point to become negative, as well as the point between the resistors R1 and R3. This causes Q1 to become conductive and increase the voltage across the output load resistor R9. The resulting positive pulse is coupled through C2 to the base of Q2 thus turning off the latter. This decreases the current through R8 and increases the current through R3 and R5 to maintain Q1 conductive.

When Q2 is conductive, the junction between R5 and R8 is approximately at ground potential, and the junction between R1 and R3 is SLIGHTLY positive with respect to ground. At the same time, C1 has thereon only a small charge. Upon reception of a negative trigger pulse, current flows through R3 and R5. This current through R3 first discharges C1 and then charges it to a negative potential on the transistor base side. This charging action provides a time delay before the base potential of Q1 rises to a point where the transistor becomes conductive. As Q1 goes into conduction, it increases the voltage across R9. The time between the reception of the trigger pulse and the instant when Q1 becomes conductive is caused by the series resistance of R3 in conjunction with the input capacitance of Q1. The increase in voltage across R9 as Q1 becomes conductive is coupled to the base of Q2 by C2 thereby turning Q2 off. It will be seen that C2 discharges primarily through R4 and R6, consequently the turn-off and storage time of Q2 provides another delay before the collector current of Q2 ceases. As Q2 turns off, the voltage across R8 begins to fall, and this fall time is relatively slow because the collector current is changing C1 through R8 and any external load (not shown) which may be parallel to it. By the time the voltage across R8 has fallen, the voltage across R9 should have risen to nearly its full value.

When the values of the various components are properly chosen, the circuit of FIG. 1 will function so that the collector voltage of the stage turned on will always rise to ground *before* the collector voltage of the stage turned off begins to fall. Reference to FIG. 2 will bring out the relationship between the respective collector voltages of Q1 and Q2, as shown by curves *c* and *d*. Referring however to curve *b*, it will be noted that the transistor base voltage of Q2 is shown for a condition where this transistor is being turned on. As brought out in the drawing, the base voltage of Q2 reaches ground potential at point E. The collector voltage of the transistor, however, does not begin to change until a later time (point F in curve *d*). Although the base voltage of transistor Q2 has become negative at point E to turn the transistor on, the built-in circuit delay does not permit the remaining transistor Q1 to be cut off until a subsequent point G is reached, at which time the base voltage of the transistor undergoes a rapid rise as shown in curve *b*.

Due to the effect of resistor R9 and capacitor C2 however, the collector voltage of Q1 falls relatively slowly, as shown by curve *c* in FIG. 2. In reference to FIG. 2 is that the change in circuit conditions brought about by the application of a particular pulse to the network occurs late in the trigger pulse cycle, and hence the arrangement is less dependent upon extremely precise synchronization than are circuits of conventional design. The fact that a fairly wide trigger or clock pulse is utilized is of no practical significance except in those applications which require unusually fast response from the flip-flop. Under practically all circumstances, the invention circuit is sufficiently quick-acting to yield satisfactory results.

Although the present invention has been illustrated and described in connection with such apparatus as computers and serial shift registers, it will be appreciated that it is capable of utilization in any environment where multivibrators or flip-flop circuits can be advantangeously employed. Although the values of the various circuit components are determined on the basis of the results desired and with a particular type of input signal in mind, nevertheless such values are not especially critical and may vary within normal limits. In practice, a circuit designed in accordance with the present disclosure has been found to operate satisfactorily with the following values:

D1, D2, D3, D4, D5 and D6=1N276
Q1, Q2=2N404
R1, R2=47,000 ohms
R3, R4=4,700 ohms
R5, R6=8,200 ohms
R7, R10=12,000 ohms
R8, R9=3,900 ohms
C1, C2=200 micromicrofarads
$+V=+12.0\pm 2v$
$-V=-12.0\pm 2v$ Obviously many modifications and variations of the present invention are possible in the light of the above teachings. It is therefore to be understood that within the scope of the appended claims the invention may be practiced otherwise than as specifically described.

I claim:

1. In a bistable multivibrator having two steady-state conditions, said multivibrator changing from one such condition to the other upon reception of a negative trigger pulse thereby, the combination of:

(*a*) a pair of PNP transistors each having base, collector and emitter electrodes, the emitter electrode of each transistor being grounded, (*b*) a pair of voltage dividers respectively associated with said pair of transistors, (*c*) a source of positive unvarying unidirectional potential connected to corresponding ends of said pair of voltage dividers, (*d*) a source of negative unvarying unidirectional potential connected to the remaining end of each voltage divider, (e) a connection between the output collector electrode of one transistor and a first point on the voltage divider associated with the other transistor, such point constituting one output terminal of the multivibrator, (f) a connection between the output collector electrode of said other transistor and a first point on the voltage divider associated with said one transistor, such point constituting the second output terminal of the multivibrator, (g) means for connecting the base electrode of each transistor to a point on its associated voltage divider which is normally at positive potential so that such transistor is non-conductive, (h) a D.-C. connection for applying a negative trigger pulse to a point on the voltage divider associated with said one transistor which lies between the point to which such transistor base electrode is connected and the point which constitutes the output of said other transistor, thereby placing a negative voltage on the base electrode of said one transistor and causing the latter to become conductive to consequently place the multivibrator in one of its steady-state conditions, (i) means including a unidirectional circuit element for applying a negative trigger pulse to a point on the voltage divider associated with said other transistor which lies between the point to which such transistor base electrode is connected and the point which constitutes the output of said one transistor, thereby placing a negative voltage on the base electrode of said other transistor and causing the latter to become conductive to consequently place the multivibrator in the other of its steady-state conditions, and (j) a pair of capacitors, one capacitor being connected between the base electrode of each transistor and the point on the voltage divider associated therewith to which the collector electrode of the other transistor is connected.

2. The combination of claim 1, in which the cut-off voltage of said other transistor may be expressed by the formula $$+V \cdot \frac{R_4}{R_2+R_4}$$

where $+V$=the source of positive unvarying potential connected to corresponding ends of said pair of voltage dividers $R_4$=the value of voltage-divider resistance existing between the point to which the base electrode of each transistor is connected and the point thereon to which said negative trigger pulse is applied $R_2$=the value of voltage-divider resistance existing between the point to which the base electrode of each transistor is connected and the source of positive unvarying potential.

3. The combination of claim 1, in which conduction of either transistor charges the capacitor associated with the remaining transistor, this charge being of the proper polarity to turn off such remaining transistor after a period of time has elapsed following the instant at which conduction of the first-mentioned transistor is initiated.

4. A bistable multivibrator in accordance with claim 1, in which the collector voltage of the transistor turned on rises to ground potential before the collector voltage of the transistor turned off begins to fall.

References Cited by the Examiner

UNITED STATES PATENTS

| | | | |
|---|---|---|---|
| 2,884,544 | 4/59 | Warnock | 307—88.5 |
| 3,054,001 | 9/62 | Chisholm et al. | 307—88.5 |
| 3,061,817 | 10/62 | Blinston | 307—88.5 X |
| 3,072,832 | 1/63 | Kilby | 307—88.5 X |

OTHER REFERENCES

Fedbusch: German printed application, No. 1,144,340.

JOHN W. HUCKERT, *Primary Examiner.*

ARTHUR GAUSS, *Examiner.*